US010254960B2

(12) United States Patent
Zhao

(10) Patent No.: US 10,254,960 B2
(45) Date of Patent: Apr. 9, 2019

(54) ELECTRONIC DEVICE THAT OPERATES UNDER ONE OF A PLURALITY OF INPUT MODES, AND METHOD OF CONTROLLING AN ELECTRONIC DEVICE

(71) Applicant: Lenovo (Beijing) Limited, Beijing (CN)

(72) Inventor: Haiwei Zhao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 270 days.

(21) Appl. No.: 15/242,935

(22) Filed: Aug. 22, 2016

(65) Prior Publication Data

US 2017/0185288 A1 Jun. 29, 2017

(30) Foreign Application Priority Data

Dec. 28, 2015 (CN) .......................... 2015 1 1001232

(51) Int. Cl.
  *G06F 3/0488* (2013.01)
  *G06F 1/16* (2006.01)
  *G06F 3/0481* (2013.01)

(52) U.S. Cl.
  CPC ........ *G06F 3/04886* (2013.01); *G06F 1/1618* (2013.01); *G06F 1/1677* (2013.01); *G06F 3/0481* (2013.01); *G06F 3/04883* (2013.01); *G06F 2203/0381* (2013.01)

(58) Field of Classification Search
  CPC .. G06F 3/04886; G06F 3/0481; G06F 1/1618; G06F 1/1677; G06F 3/04883; G06F 2203/0381
  See application file for complete search history.

(56) References Cited

U.S. PATENT DOCUMENTS

| 8,817,457 B1* | 8/2014 | Colby ................... G06F 1/1669 206/320 |
| 2007/0250262 A1 | 10/2007 | Lee et al. |
| 2010/0245209 A1* | 9/2010 | Miller ................... G06F 1/1618 345/1.3 |
| 2011/0015894 A1 | 1/2011 | Chu |
| 2012/0105244 A1 | 5/2012 | Song et al. |
| 2013/0215008 A1 | 8/2013 | Hung |
| 2014/0111548 A1 | 4/2014 | Shin |
| 2014/0340310 A1 | 11/2014 | Cheng et al. |

(Continued)

FOREIGN PATENT DOCUMENTS

| CN | 101957634 A | 1/2011 |
| CN | 103257705 A | 8/2013 |
| CN | 103558981 A | 2/2014 |

(Continued)

*Primary Examiner* — Andrew Sasinowski
(74) *Attorney, Agent, or Firm* — Kunzler, PC

(57) ABSTRACT

An electronic device is disclosed. The electronic device may include a display device and an input device for user input. The input device may be movably coupled to the display device. The electronic device may include a processor coupled to the display device and the input device. The processor may detect a first and a second operating mode of the electronic device, and then may control the input device to operate either under the first input mode or the second input mode respectively in accordance with the detected relative arrangement. A method and programming product are also disclosed.

20 Claims, 12 Drawing Sheets

(56) References Cited

U.S. PATENT DOCUMENTS

2015/0206284 A1* 7/2015 Yang .................... G06F 1/1618
345/659

FOREIGN PATENT DOCUMENTS

| CN | 103853444 A | 6/2014 |
|---|---|---|
| CN | 103870042 A | 6/2014 |
| CN | 104166473 A | 11/2014 |
| CN | 104345874 A | 2/2015 |
| CN | 104375559 A | 2/2015 |
| CN | 104423829 A | 3/2015 |
| TW | 201218017 A | 5/2012 |

* cited by examiner

ELECTRONIC DEVICE THAT OPERATES UNDER ONE OF A PLURALITY OF INPUT MODES, AND METHOD OF CONTROLLING AN ELECTRONIC DEVICE

FIELD

The subject matter disclosed herein relates to the field of electronic devices, and in particular, to an information processing method and an electronic device.

BACKGROUND

A physical keyboard structure may be provided for an electronic device. A user may perform input based on the keyboard structure. However, in an existing electronic device, a user is only able to perform input based on the physical keyboard, thereby providing a single input method and poor user experience.

SUMMARY

An electronic device is disclosed. The electronic device may include a display device. The electronic device may include an input device. The input device may provides multiple input modes for user input. The input device may be movably coupled to the display device. The electronic device may include a processor coupled to the display device and the input device. In one embodiment, the processor may detect a first and a second operating mode of the electronic device and control the input device to operate in a first and a second input mode respectively.

In one embodiment, the processor may detect the first or second operating mode of the electronic device based on a relative arrangement of the display device and the input device. In one embodiment, the processor may control the input device to operate under the first input mode in response to the display device being extended from the input device through an angle that exceeds a threshold angle. In one embodiment, the processor may control the input device to operate under the second input mode in response to the display device being extended from the input device through an angle that does not exceed the threshold angle. In one embodiment, the threshold angle may be 180 degrees.

In some embodiments, the display device may provide a further input mode for user input. In one embodiment, in response to the processor controlling the input device to operate under the first input mode, the input device may present a keyboard input interface. In response to the processor controlling the input device to operate under the second input mode, the input device may present a writing input interface. In one embodiment, the keyboard input interface may include a virtual keyboard displayed on the input device.

In some embodiments, one of the first or second operating modes may include one or more of multiple operating modes. In one embodiment, the operating mode may include an off mode. The off operating mode may include the display device or the input device not accepting input. In one embodiment, the operating mode may include a notebook mode. The notebook operating mode may include the display device or the input device including a substantially horizontal orientation. In one embodiment, the operating mode may include a magazine mode. The magazine mode may include the display device or the input device including a substantially vertical orientation.

In one embodiment, the operating mode may include a stand mode. The stand mode may include the relative arrangement of the display device and the input device being disposed at an angle between 180 and 360 degrees from each other. In one embodiment, the operating mode may include a tablet mode. The tablet mode may include the relative arrangement of the display device and the input device including an angle of 360 degrees.

A method is disclosed. The method may include detecting an operating mode of an electronic device. The electronic device may include a display device and an input device that is movably coupled to the display device. In one embodiment, the method may include controlling the input device of the electronic device to operate under a first input mode in response to detecting a first operating mode of the electronic device or a second input mode in response to detecting a second operating mode of the electronic device.

In one embodiment, the step of detecting the operating mode of the electronic device may include detecting a relative arrangement of the display device and the input device. In one embodiment, the method may include detecting the relative arrangement of the display device and the input device may include detecting an angle through which the display device extends from the input device. In some embodiments, controlling the input device to operate under the first input mode and the second input mode may include, in response to detecting that the angle exceeds a threshold angle, controlling the input device to operate under the first input mode, and, in response to detecting that the angle does not exceed the threshold angle, controlling the input device to operate under the second input mode. In one embodiment, the threshold angle may be 180 degrees.

In one embodiment, controlling the input device to operate under the first input mode may include presenting a keyboard input interface. Controlling the input device to operate under the second input mode may include presenting a writing input interface. In one embodiment, the step of presenting the keyboard input interface may include displaying a virtual keyboard on the input device.

In one embodiment, detecting the first or second operating mode of the electronic device may include detecting an operating mode of the electronic device. In one embodiment, the operating mode may include an off mode. The off operating mode may include the display device or the input device not accepting input. In one embodiment, detecting mode may include a notebook mode. The notebook operating mode may include the display device or the input device including a substantially horizontal orientation. In one embodiment, the operating mode may include a magazine mode. The magazine mode may include the display device or the input device including a substantially vertical orientation.

In one embodiment, the operating mode may include a stand mode. The stand mode may include the relative arrangement of the display device and the input device being disposed at an angle between 180 and 360 degrees from each other. In one embodiment, the operating mode may include a tablet mode. The tablet mode may include the relative arrangement of the display device and the input device including an angle of 360 degrees.

A program product is disclosed. The program product may include a non-transitory computer readable storage medium. The storage medium may store code executable by a processor. In one embodiment, the executable code may include code to perform detecting an operating mode of an electronic device that may include a display device and an input device that is movably coupled to the display device.

The executable code may include code to perform controlling the electronic device to operate under a first input mode in response to detecting a first operating mode of the electronic device or a second input mode in response to detecting a second operating mode of the electronic device.

In some embodiments, the code to perform detecting the operating mode of the electronic device may include code to perform detecting a relative arrangement of the display device and the input device. In one embodiment, the code to perform controlling the input device to operate under the first input mode and the second input mode may include code to perform in response to detecting that the angle exceeds a threshold angle, controlling the input device to operate under the first input mode, and in response to detecting that the angle does not exceed the threshold angle, controlling the input device to operate under the second input mode. In one embodiment, the threshold angle may be 180 degrees.

In one embodiment, the executable code may include code to perform, in response to controlling the input device to operate under the first input mode, presenting a keyboard input interface, and in response to controlling the input device to operate under the second input mode, presenting a writing input interface.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are/not therefore to be considered to be limiting of scope, embodiments will be described and explained with additional specificity and detail through the use of the accompanying drawings, in which.

DETAILED DESCRIPTION

The embodiments of the present disclosure are described with reference to the accompanying drawings. It is obvious that, the embodiments described are not all, but rather only some, of the embodiments of the present disclosure. All other embodiments obtained based on the embodiments of the present disclosure by those skilled in the art without creative work shall fall within the scope of the present disclosure.

Figure 1:
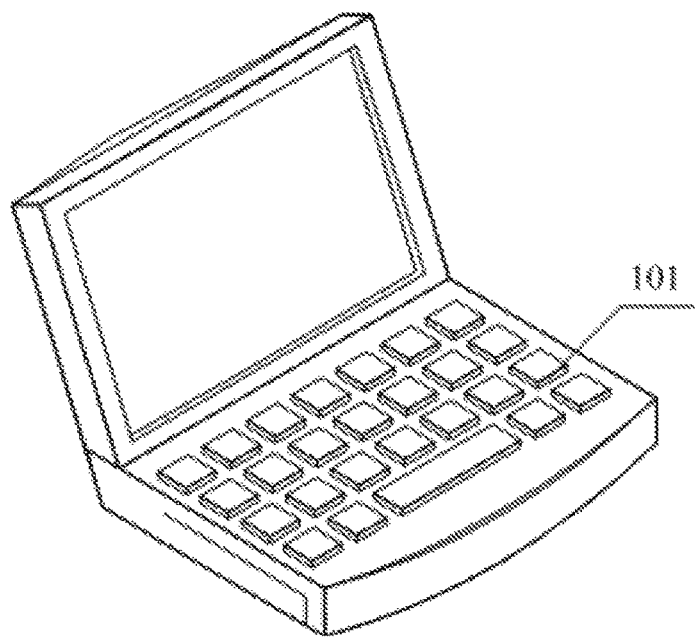
FIG. 1 is a schematic structural diagram illustrating one embodiment of a laptop.

FIG. 1 depicts one embodiment of a laptop. The laptop may include an input device 101. The input device 101 may include a keyboard. In some embodiments, the input device 101 of a conventional laptop may include only one input mode of the input device 101. For example, the input mode may include a keyboard input mode.

Figure 2:
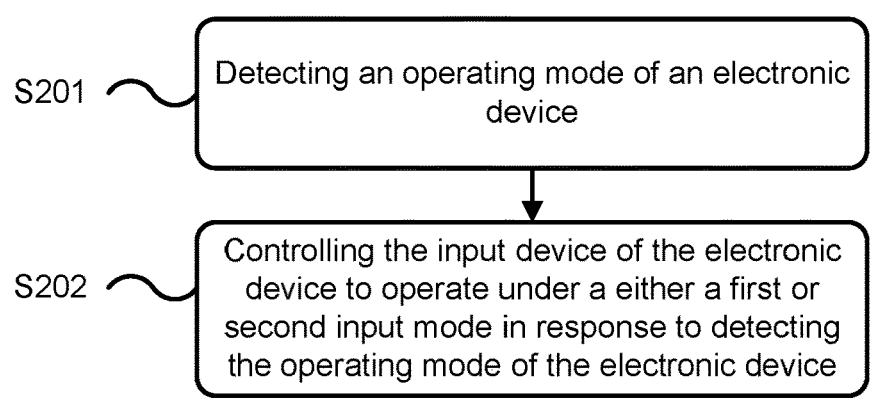
FIG. 2 is a flow diagram illustrating one embodiment of a method.

FIG. 2 is a schematic flowchart illustrating one embodiment of a method 200. The method 200 may be applied to an electronic device. The electronic device may specifically be an electronic device in a form of a laptop, a tablet personal computer, a mobile phone, a smart television, a smart watch, a wearable device, or the like. The electronic device may include an input device.

Step S201 involves detecting an operating mode of an electronic device that includes a display device and an input device that is movably coupled to the display device.

In one embodiment, detecting the operating mode of the electronic device may include detecting a relative arrangement of the display device and the input device. In one embodiment, detecting a relative arrangement of the display device and the input device may include detecting the orientation information of the electronic device. The relative arrangement may include a placement method of the electronic device. The electronic device may adopt different input modes based on different relative arrangements of the display device and the input device.

In one embodiment, orientations of the electronic device may correspond to use methods in a process of using the electronic device by a user. Based on different orientations of the electronic device, the user may adopt one or more corresponding methods of use.

In some embodiments, the relative arrangement of the display device and the input device of the electronic device may be a placement based on a horizontal plane. The electronic device may be placed in parallel to the horizontal plane, vertically to the horizontal plane, or in a manner of being partially parallel to the horizontal plane and partially forming an included angle with the horizontal plane. The orientations of the electronic device are further explained in following embodiments.

Step S202 involves controlling the input device of the electronic device to operate under a either a first input mode or a second input mode in response to detecting the operating mode of the electronic device.

The relative arrangement may be indicative of the orientation of the electronic device. The orientation of the electronic device may correspond to a use scenario of the electronic device. Based on one or more different orientations of the electronic device, the user can adopt a corresponding use method.

Thus, based on the methods of use, different input modes of the electronic device can be set, and the user may perform input based on the input modes. In one embodiment, corresponding input modes are set for different orientations in advance. The input modes can each include an input structure and a working state, working mode, and the like of the input structure.

Step S203 involves generating a first control instruction based on the input mode to control a working state, corresponding to the input mode, of the input device and a working mode of the input device in an operating state.

The input device of the electronic device may include different working states corresponding to different input modes and can have different working modes when the input device is in the operating state. The working state may include an operating state and an off state.

Specifically, after determining an input mode of the electronic device, the first control instruction is generated based on the determined input mode. The first control instruction may control a situation, corresponding to the input mode, of the input device.

Specifically, the situation of the input device may include a working state and an off state. The working state may include a plurality of working modes. The working modes are illustrated in the following embodiments.

In conclusion, a method provided in this embodiment may be applied to an electronic device having at least two input modules. The method may include detecting a relative arrangement of a display device of an electronic device and an input device of the electronic device. The method may include controlling the electronic device to operate either under a first input mode or a second input mode in accordance with said relative arrangement as detected. The first input mode may provide user input via the display device whereas the second input mode provide user input via the input device. The method may include generating a first control instruction based on the input mode to control a working state, corresponding to the input mode, of the input device and a working mode of the input device in an operating state.

By means of this method, the input mode of the electronic device may be determined based on the orientation information of the electronic device, and the working state of the input device of the electronic device and the working mode of the input device in the operating state are further controlled based on the determined input mode, thereby enabling the user to perform input by means of multiple working modes. This method may include the advantages that an input form is added, and the user can select a plurality of input methods corresponding to the multiple working modes to perform input, thereby improving the user experience.

Figure 3:
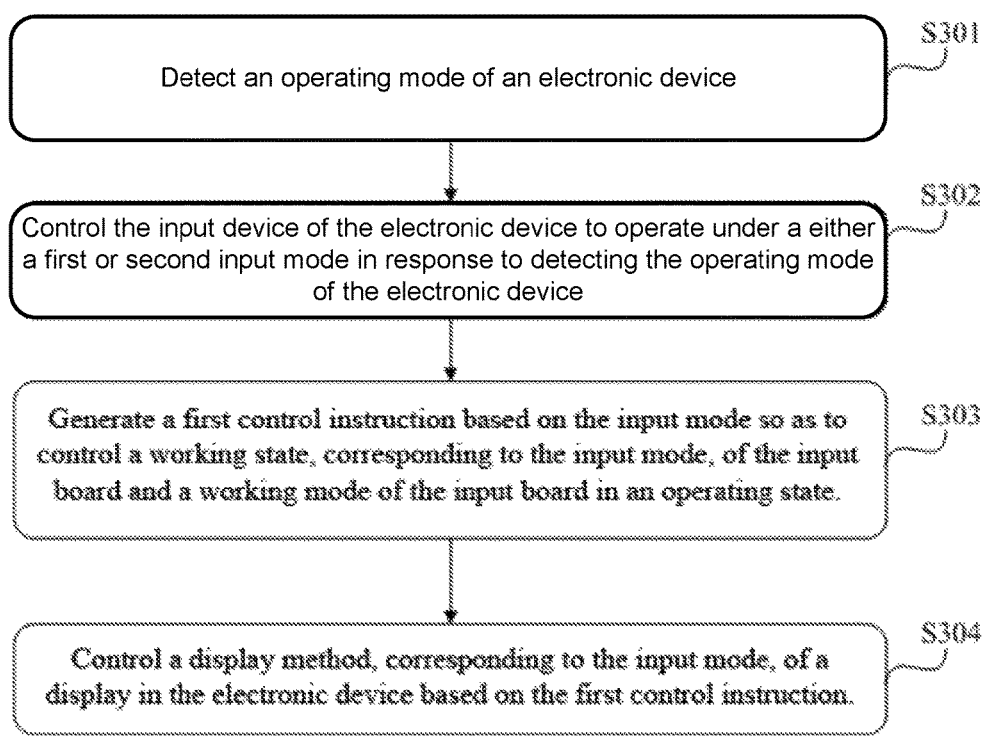
FIG. 3 is a flow diagram illustrating one embodiment of a method.

FIG. 3 depicts a flow diagram of one embodiment of a method.

Step S301 involves detecting an operating mode of an electronic device that includes a display device and an input device that is movably coupled to the display device.

Step S302 involves controlling the input device of the electronic device to operate under a either a first input mode or a second input mode in response to detecting the operating mode of the electronic device.

Step S303 involves generating a first control instruction based on the input mode to control a working state, corresponding to the input mode, of the input device and a working mode of the input device in an operating state.

Step S301 to step S303 are consistent with step S201 to step S203 described above and therefore are not described in detail in this embodiment.

Step S304 involves controlling a display method, corresponding to the input mode, of a display in the electronic device based on the first control instruction.

When using the electronic device, a user may execute an input operation via the input device and may check content output by the electronic device via the display device. Based on different orientations or relative arrangements of the electronic device, it may be advantageous to adjust the working mode of the input device and the display method of the display device accordingly. The input mode of the electronic device may match the display method, and when using the electronic device, the user has coordinated use experience. The display method of the display in the electronic device may be controlled accordingly according to the first control instruction generated based on the input mode, such that the display method of the display device matches the working state/working mode of the input device.

As a specific example, the electronic device may present a notebook style orientation. A first part of the electronic device may be located approximately parallel to a horizontal plane and an included angle being greater than 90° and less than 180° may exist between the plane and a second part of the electronic device. The display device may display by using an intersecting line of the first part and the second part as a bottom edge.

As a specific example, the electronic device presents a magazine style orientation. An included angle may exist between a first part and second part of the electronic device and another included angle exists between an intersecting line of the first part and the second part, and the horizontal plane. The display device may display by using an intersecting line of the first part and the second part as a side edge.

In conclusion, the method provided in this embodiment may include controlling the display method, corresponding to the input mode, of the display device in the electronic device based on the first control instruction. By means of this method, in correspondence to the input mode, the display method of the display device may be adjusted accordingly, such that the input mode of the electronic device may match the display method, thereby improving the user experience.

The orientation information may include a first angle value indicative of an included angle between a first surface and second surface of the electronic device. The first surface and the second surface may not be on the same plane.

Figure 4:
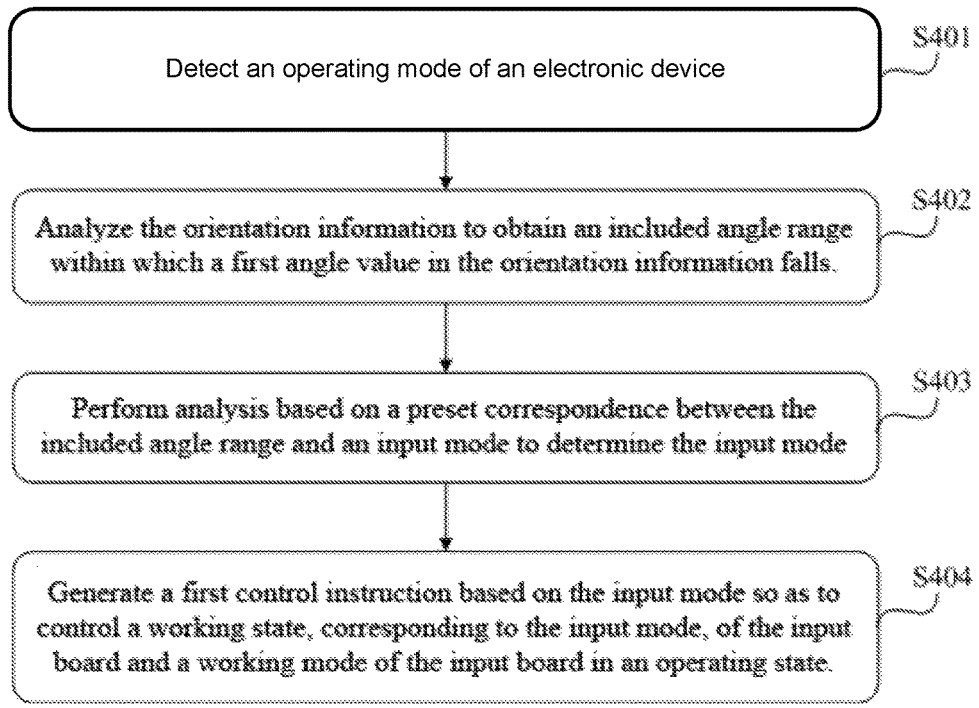
FIG. 4 is a flow diagram illustrating one embodiment of a method.

FIG. 4 depicts a flow diagram of one embodiment of a method.

Step S401 involves detecting an operating mode of an electronic device that includes a display device and an input device that is movably coupled to the display device.

Step S401 is consistent with step S201 in the embodiment 1, and is not described in detail in this embodiment.

Step S402 involves analyzing the orientation information to obtain an included angle range within which a first angle value in the orientation information falls.

Figure 5:
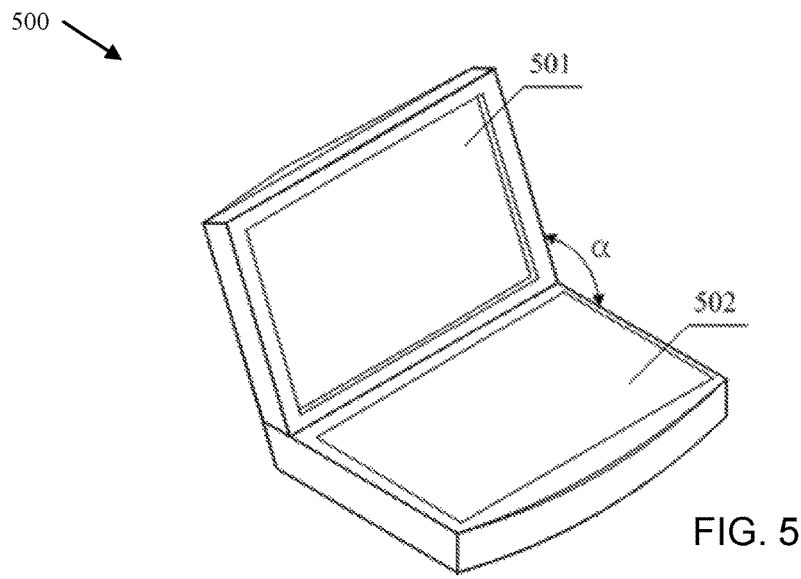
FIG. 5 is a schematic orientation diagram illustrating one embodiment of an electronic device.

FIG. 5 shows a schematic orientation diagram of one embodiment of an electronic device. An included angle α may exist between a first surface 501 and second surface 502 of the electronic device. Illustrations are made in this embodiment by using a laptop as an example. The first surface may include a surface B of the laptop and the second surface may include a surface C of the laptop. An input device may be provided on the surface C, and an included angle α may exist between the surface B and the surface C.

If the orientation information acquired in step S401 includes the first angle value between the first surface and the second surface, then the first angle value may be obtained by analyzing the orientation information. For example, a preset angle range of 0°-360° can be divided into a plurality of intervals such as, 0°, 0°-180°, 180°-360°, 360° or 0°-360° and the like. Then, an included angle range within which the first angle value falls may be obtained through analysis based on the preset angle range.

Step S403 involves performing analysis based on a preset correspondence between the included angle range and an input mode to determine the input mode corresponding to the orientation information. A preset correspondence between an included angle range, between the first surface and the second surface, and the input mode may be preset in the electronic device. Specifically, the corresponding input mode may be determined based on the included angle range within which the first angle value falls.

For example, when the included angle range is 0°, the input mode may include a closed state, and accordingly, the working state of the input device is an off state. When the included angle range is 0°-360°, the input mode may include an open state, and accordingly, the working state of the input device may include an operating state. When the included angle range is 0°-180°, the working mode of the input device may include a common mode. When the included angle range is 180°-360°, the working mode of the input device may include a stand mode. When the included angle range is 360°, the working mode of the input device may include a tablet mode.

Step S404 involves generating a first control instruction based on the input mode to control a working state, corresponding to the input mode, of the input device and a working mode of the input device in an operating state. Step S404 is consistent with step S203 described above, and is not described in detail in this embodiment.

In conclusion, in the method provided in this embodiment, if the orientation information includes the first angle value indicative of the included angle between the first surface and second surface of the electronic device, the first surface and the second surface not being on the same plane, then performing analysis according to the orientation information to obtain the input mode corresponding to the orientation information may include analyzing the orientation information to obtain an included angle range within which the first angle value in the orientation information falls.

The method may include performing analysis based on a preset correspondence between the included angle range and the input mode to determine the input mode corresponding to the orientation information. The input mode of the electronic device may be obtained through analysis based on the included angle value between the two surfaces of the electronic device and may control the working state of the input device and resulting in a small amount of data processing amount and a simple process.

The orientation information or relative arrangement may further include a first angle value and a second angle value. The first angle value may be indicative of the included angle between the first surface and second surface of the electronic device. The second angle value may be indicative of an included angle between an intersecting axis of the first surface and the second surface, and a horizontal plane. The first surface and the second surface may not be on the same plane.

Figure 6:
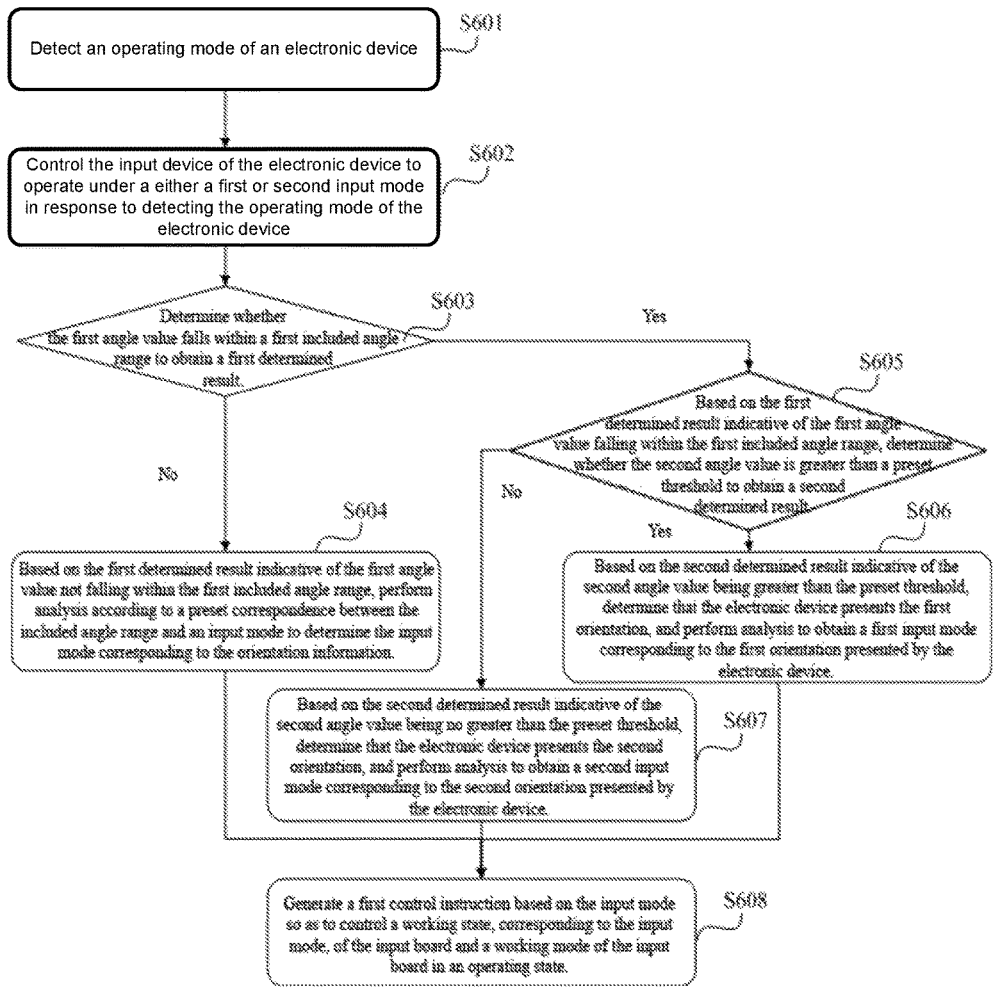
FIG. 6 is a flow diagram illustrating one embodiment of a method.

FIG. 6 depicts a flow diagram of one embodiment of a method.

Step S601 involves detecting an operating mode of an electronic device that includes a display device and an input device that is movably coupled to the display device. Step S601 is consistent with step S201 in the embodiment 1, and is not described in detail in this embodiment.

Step S602 involves controlling the input device of the electronic device to operate under a either a first input mode or a second input mode in response to detecting the operating mode of the electronic device.

Figure 7:
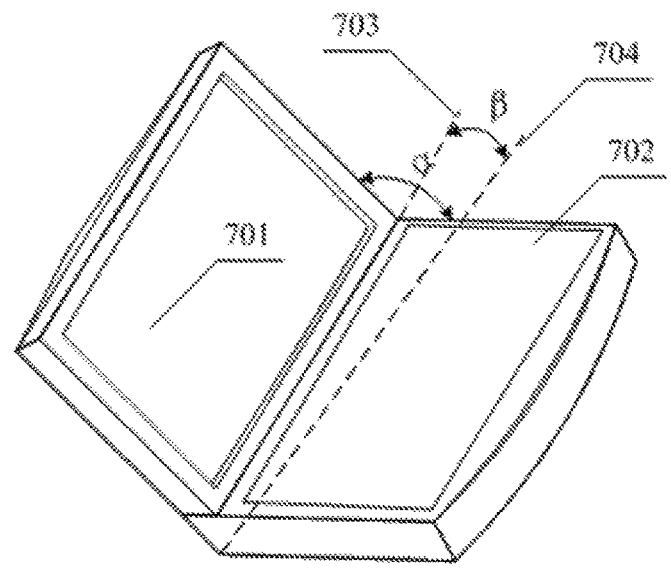
FIG. 7 is a perspective view illustrating one embodiment of an electronic device.

FIG. 7 shows a diagram of one embodiment of an electronic device. An included angle α may exist between a first surface 701 and second surface 702 of the electronic device. An included angle β exists between an intersecting axis 703, of the first surface 701 and the second surface 702, and a horizontal plane. Illustrations are made in this embodiment by using a laptop as an example. The first surface may include a surface B of the laptop and the second surface may include a surface C of the laptop. An input device may be provided on the surface C, the included angle α may exist between the surface B and the surface C. The included angle β may exist between an axis of the laptop and the horizontal plane. Dotted lines are adopted to represent an axial line 703 and a projection line 704 of the axial line to the horizontal plane.

If the orientation information acquired in step S601 includes a first angle value between the first surface and the second surface and a second angle value between an intersecting axis of the first surface and the second surface and the horizontal plane, then the first angle value and the second angle value may be obtained by analyzing the orientation information.

Step S603 involves determining whether the first angle value falls within a first included angle range to obtain a first determined result.

If the electronic device presents a specific orientation, it may be advantageous to determine an input mode of the electronic device by combining an included angle between the first surface and second surface of the electronic device and an included angle between the intersecting axis of the first surface and the second surface and the horizontal plane. In one embodiment, when the first angle value falls within the first included angle range, the electronic device may present the specific orientation, therefore to the electronic device may firstly determine whether the first angle value of the electronic device falls within the first included angle range.

If the first angle value does not fall within the first included angle range, step S604 may be executed, otherwise, step S605 may be executed.

In Step S604, based on the first determined result indicative of the first angle value not falling within the first included angle range, an analysis is performed according to a preset correspondence between the included angle range and an input mode to determine the input mode corresponding to the orientation information. If the first angle value does not fall within the first included angle range, the electronic device may not present the specific orientation, and in this case, the input mode corresponding to the electronic device may be directly determined according to the orientation information.

The preset correspondence between the included angle range, between the first surface and the second surface, and the input mode may be preset in the electronic device. Specifically, the included angle range within which the first angle value falls may be determined according to a division angle range preset in the electronic device. The input mode corresponding to the included angle range within which the first angle value falls may be determined based on the preset correspondence between the included angle range and the input mode to determine the input mode corresponding to the orientation information of the electronic device.

In a specific implementation, a division angle range rule may be preset in the electronic device. For example, an angle range of 0°-360° can be divided into a plurality of intervals such as, 0°, 180°-360°, 360° or 0°-360° and the like. For example, if the included angle range is 0°, the input mode may include a closed state, and accordingly, the working state of the input device may include an off state. If the included angle range is 0°-360°, the input mode may include an open state, and accordingly, the working state of the input device may include an operating state. If the included angle range is 0°-180°, the working mode of the input device may include a notebook mode and a magazine mode. If the included angle range is 180°-360°, the working mode of the input device may include a stand mode. If the included angle range is 360°, the working mode of the input device may include a tablet mode. If the included angle range is 0°-360°, the working mode of the input device may include a book mode. Then, the first included angle range in this embodiment may be set as 0°-180°.

In Step S605, based on the first determined result indicative of the first angle value falling within the first included angle range, a determination is made whether the second angle value is greater than a preset threshold in order to obtain a second determined result.

The working mode of the input device may include a notebook mode and a magazine mode. In the two working modes, value ranges of the first angle value between the first surface and second surface of the electronic device may be identical. The method may further determine the working mode of the input device by combining the second angle value between the intersecting axis, between the first surface and second surface of the electronic device, and the horizontal plane. In one embodiment, if the electronic device presents a magazine use orientation, the second angle value may be relatively large, and if the electronic device presents a notebook use orientation, the second angle value may be relatively small.

Thus, a preset threshold may be set in this embodiment, and whether the orientation of the electronic device is a first orientation or a second orientation may be determined based on the threshold.

In Step S606, based on the second determined result indicative of the second angle value being greater than the preset threshold, it is determined whether the electronic device presents the first orientation, and analysis is performed to obtain a first input mode corresponding to the first orientation presented by the electronic device.

In step S607, based on the second determined result indicative of the second angle value being no greater than the preset threshold, it is determined whether the electronic device presents the second orientation, and analysis is performed to obtain a second input mode corresponding to the second orientation presented by the electronic device.

In this embodiment, the first orientation may be the magazine use orientation, and the second orientation may be the notebook use orientation.

Figure 8A:
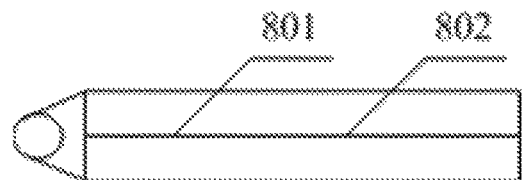
FIG. 8A is a side view illustrating one embodiment of an off state working mode of an input device of an electronic device.
Figure 8B:
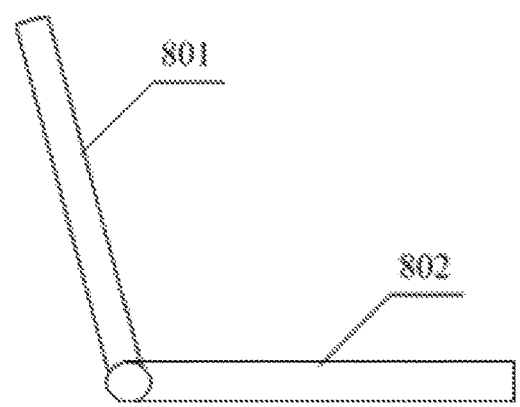
FIG. 8B is a side view illustrating one embodiment of notebook state working mode of an input device of an electronic device.
Figure 8C:
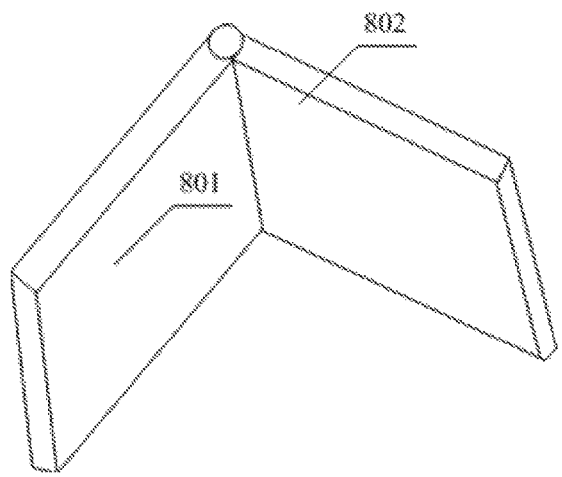
FIG. 8C is a perspective view illustrating one embodiment of magazine mode working mode of an input device of an electronic device.
Figure 8D:
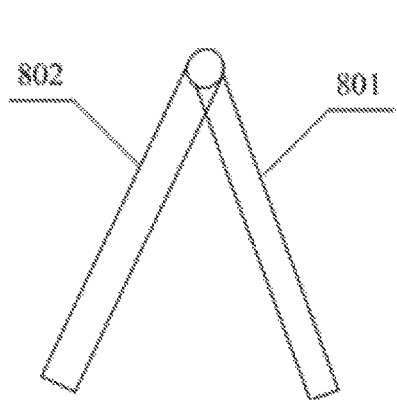
FIG. 8D is a side view illustrating one embodiment of a stand mode working mode of an input device of an electronic device.
Figure 8E:
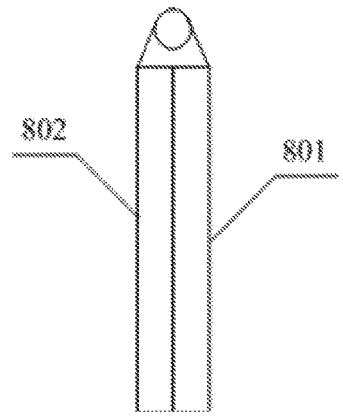
FIG. 8E is a side view illustrating one embodiment of a tablet mode working mode of an input device of an electronic device.
Figure 8F:
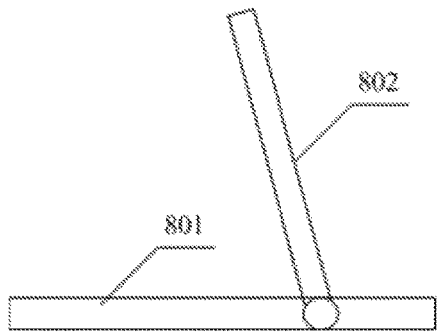
FIG. 8F is a side view illustrating one embodiment of a book mode working mode of an input device of an electronic device.

FIGS. 8A-8F shows a schematic overall orientation diagram of one embodiment an electronic device. The electronic device may include a first surface and a second surface. Illustrations are made in this embodiment by using a laptop as an example. The first surface 801 may include a surface B of the laptop, the second surface 802 is a surface C of the laptop, and an input device may be provided on the surface C. In FIG. 8(*a*), a working state of the input device may include an off state, in FIG. 8(*b*), a working mode of the input device may include a notebook mode, in FIG. 8(*c*), a working mode of the input device may include a magazine mode, in FIG. 8(*d*), a working mode of the input device may include a stand mode, in FIG. 8(*e*), a working mode of the input device may include a tablet mode, in FIG. 8(*f*), a working mode of the input device may include a book mode, and FIGS. 8A, 8B, 8D, 8E, and 8F are side views and FIG. 8C is a top view.

Step S608 involves generating a first control instruction based on the input mode to control a working state corresponding to the input mode, of the input device and a working mode of the input device in an operating state.

Step S608 is consistent with step S203 described above, and is not described in detail in this embodiment.

In conclusion, in the method provided in this embodiment, performing analysis based on a correspondence between the included angle range and the input mode to determine the input mode corresponding to the orientation information may include analyzing the orientation information to obtain the first angle value in the orientation information, determining whether the first angle value falls within the first included angle range to obtain a first determined result; based on the first determined result indicative of the first angle value not falling within the first included angle range, performing analysis according to a preset correspondence between the included angle range and the input mode to determine the input mode corresponding to the orientation information. Based on the first determined result indicative of the first angle value falling within the first included angle range, the method may include determining whether the second angle value is greater than the preset threshold to obtain the second determined result. Based on the second determined result indicative of the second angle value being greater than the preset threshold, the method may include determining that the electronic device presents the first orientation, and performing analysis to obtain the first input mode corresponding to the first orientation presented by the electronic device. Based on the second determined result indicative of the second angle value being no greater than the preset threshold, the method may include determining that the electronic device presents the second orientation, and performing analysis to obtain the second input mode corresponding to the second orientation presented by the electronic device. By means of this method, an orientation of the electronic device may be obtained by specific analysis based on the included angle value between the two surfaces of the electronic device and an included angle value between the intersecting axis of the two surfaces and a horizontal plane. Corresponding working states and working modes of the input device may be determined according to different orientations, thereby achieving detailed classification and guaranteeing the user experience.

Figure 9:
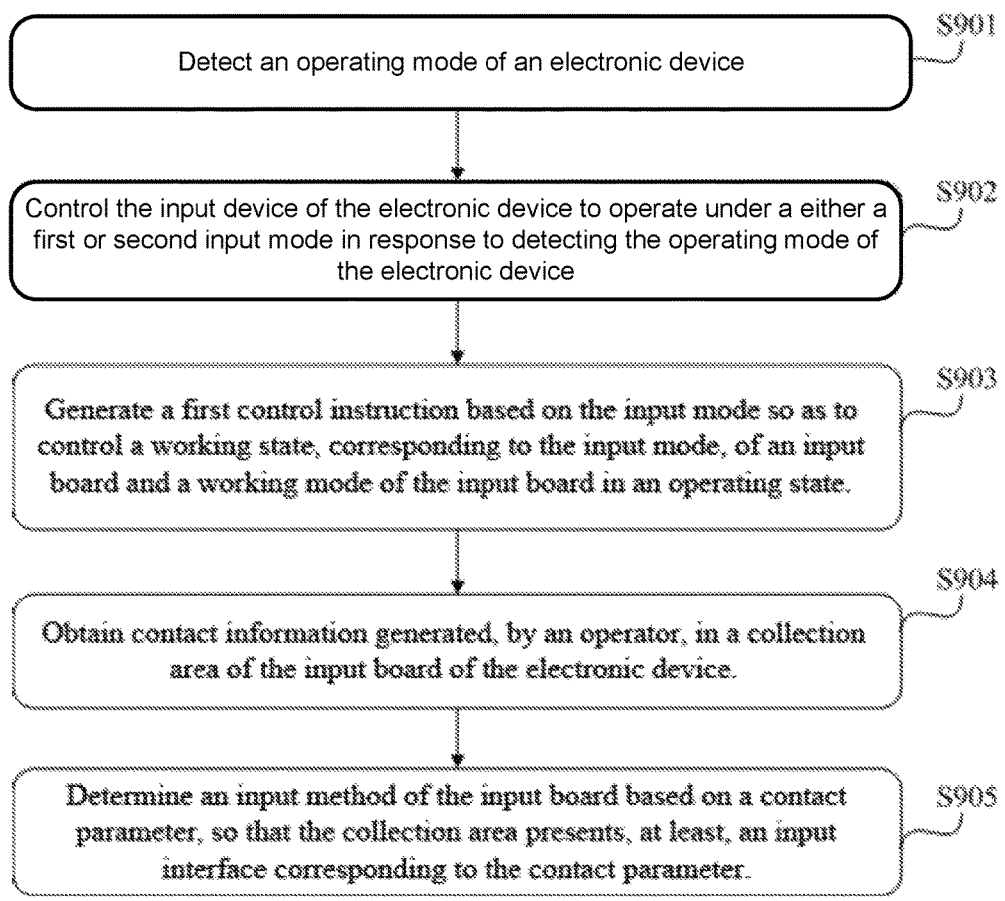
FIG. 9 is a flow diagram of an embodiment of a method.

FIG. 9 shows a flow diagram of one embodiment of a method. Step S901: involves detecting an operating mode of an electronic device that includes a display device and an input device that is movably coupled to the display device.

Step S902 involves controlling the input device of the electronic device to operate under a either a first input mode or a second input mode in response to detecting the operating mode of the electronic device.

Step S903 involves generating a first control instruction based on the input mode to control a working state, corresponding to the input mode, of an input device and a working mode of the input device in an operating state.

Step S901 to step S903 are consistent with step S201 through step S203 described above, and are not be described in detail in this embodiment.

Step S904 involves obtaining contact information generated, by an operator, in a collection area of the input device of the electronic device.

The operator may comprise a user's finger, a pen, or the like. In one embodiment, because different operators generate different pieces of contact information in the collection area of the input device, an operator in contact with the input device may be obtained through analysis based on the corresponding contact information. The contact information may include a contact area, a ratio of the contact area to an effective area of a pressure sensing value, or other contact related information.

Step S905 involves determining an input method of the input device based on a contact parameter, so that the collection area presents, at least, an input interface corresponding to the contact parameter. In one embodiment, the type of an operator executing an input operation in the collection area of the input device may be obtained through analysis based on the contact parameter, thereby determining a working mode corresponding to the type of the operator of the input device. The input method of the input device may specifically comprise a handwriting input mode and a keyboard input mode. In response to the processor controlling the input device to operate under the handwriting input mode, the user may input information via the input device via a stylus and/or his finger. However, in response to the processor controlling the input device to operate under the keyboard input mode, a virtual keyboard is displayed on the input device so that the user may input information via the display virtual keyboard.

In some embodiments, if it is determined, through analysis based on the contact parameter, that the operator is a user's finger, the method may determine that the corresponding input method is a keyboard input mode. If the method determines, through analysis based on the contact parameter, that the operator is a pen, the method may determine that the corresponding input method is a writing input mode. If the input method of the input device is the writing input mode, the input device may also carry paper, such that writing, drawn on the paper using a pen, of a user can be simultaneously collected by the input device.

In conclusion, the method provided in this embodiment may include obtaining contact information generated by an operator in a collection area of an input device of an electronic device and determining an input method of the input device based on a contact parameter. The collection area may present, an input interface corresponding to the contact parameter. The input method of the input device corresponding to the operator may be determined based on the contact information generated by an operation of the operator in the collection area of the input device. The corresponding input interface may be automatically presented in the collection area, thereby achieving a switching of the corresponding input interface based on the operator adopted by the user and improving the user experience.

Figure 10:
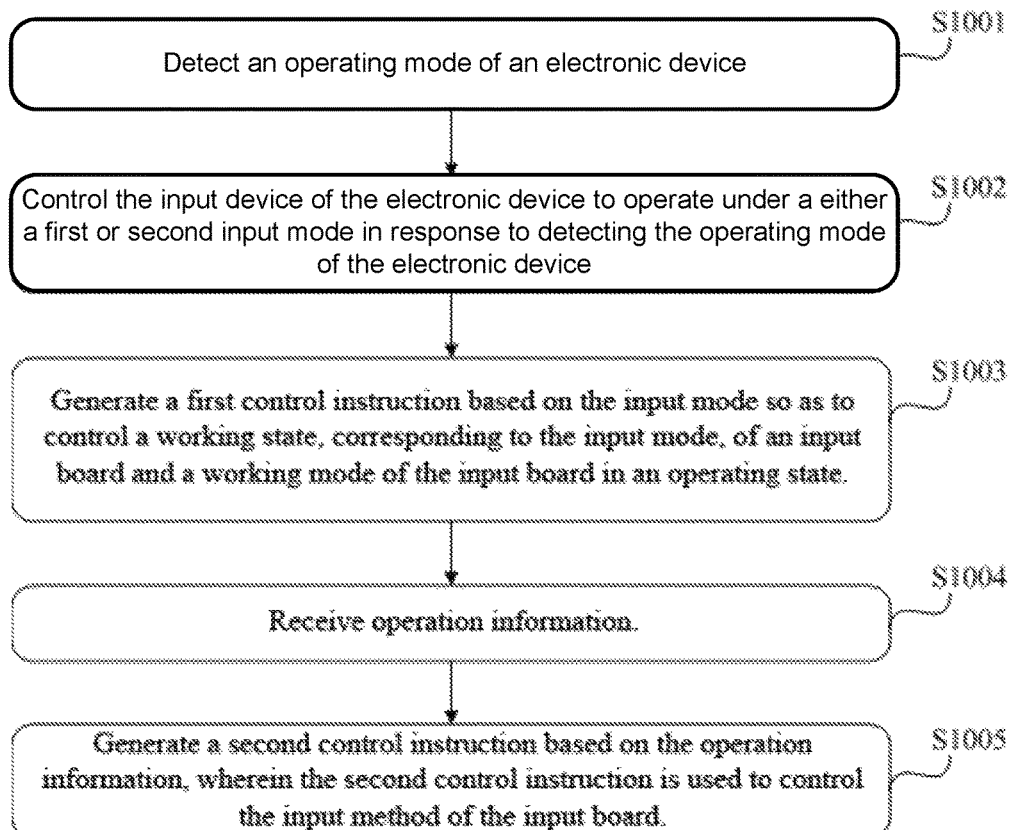
FIG. 10 is a flow diagram of an embodiment of a method.

FIG. 10 depicts a flow diagram of one embodiment of a method.

Step S1001 involves detecting an operating mode of an electronic device that includes a display device and an input device that is movably coupled to the display device.

Step S1002 involves controlling the input device of the electronic device to operate under either a first input mode or a second input mode in response to detecting the operating mode of the electronic device.

Step S1003 involves generating a first control instruction based on the input mode to control a working state, corresponding to the input mode, of an input device and a working mode of the input device in an operating state.

Step S1001 to step S1003 are consistent with step S201 to step S203 described above and therefore are not described in detail in this embodiment.

Step S1004 involves receiving operation information. The operation information may be indicative of an operator executing an input operation in a preset input area of the electronic device. An input area configured to switch an input method may be provided in the electronic device. The input area may specifically be a physical key of the electronic device or a virtual key on a touch screen of the electronic device.

Step S1005 involves generating a second control instruction based on the operation information, wherein the second control instruction is used to control the input method of the input device.

If the operation information is indicative of a keyboard input method of the input device being opened, the second control instruction generated based on the operation information may be used to control the input device to open the keyboard input method. If the operation information is indicative of a writing input method of the input device being opened, the second control instruction generated based on the operation information may be used to control the input device to close the keyboard input method and to open the writing input method. In one embodiment, the input device may include two input interfaces corresponding to the writing input method and the keyboard input method, and the input interfaces corresponding to the input methods are presented based on the different input methods.

In conclusion, the method provided in this embodiment may include receiving operation information, the operation information being indicative of an operator executing an input operation in a preset input area of an electronic device, and generating a second control instruction based on the operation information. The second control instruction may be used to control an input method of an input device. The input interfaces in the collection area may be switched based on user selection, thereby improving the user participation, supporting the user control, and improving the user experience. A working state of the input device may include an operating state and an off state. The operating state may include at least two working modes.

Figure 11:
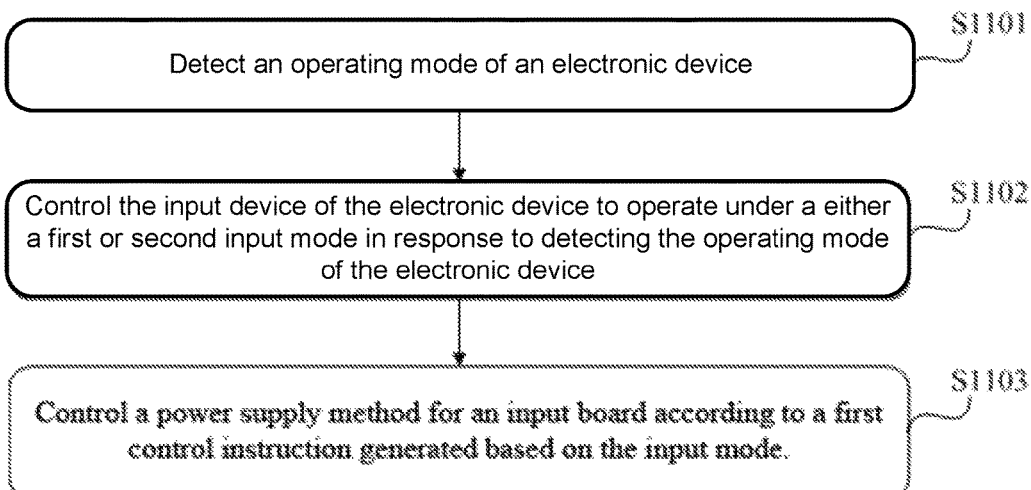
FIG. 11 is a flow diagram of an embodiment of a method.

FIG. 11 shows a flow diagram illustrating one embodiment of a method.

Step S1101 involves detecting an operating mode of an electronic device that includes a display device and an input device that is movably coupled to the display device.

Step S1102 involves controlling the input device of the electronic device to operate under a either a first input mode or a second input mode in response to detecting the operating mode of the electronic device.

Step S1101 and step S1102 are consistent with step S201 to step S203 described above, therefore are not described in detail in this embodiment.

Step S1103 involves controlling a power supply method for an input device according to a first control instruction generated based on the input mode.

The power supply method may include a power supply cut-off method, a first power supply method and a second power supply method. In some embodiments, if power is supplied to the input device in the first power supply method, a collection area of the input device may present a keyboard input interface containing a keyboard format. If power is supplied to the input device in the second power supply method, the collection area of the input device may present a writing input interface. In certain embodiments, if a power supply to the input device is cut off, a working state of the input device may include an off state.

Figure 12:
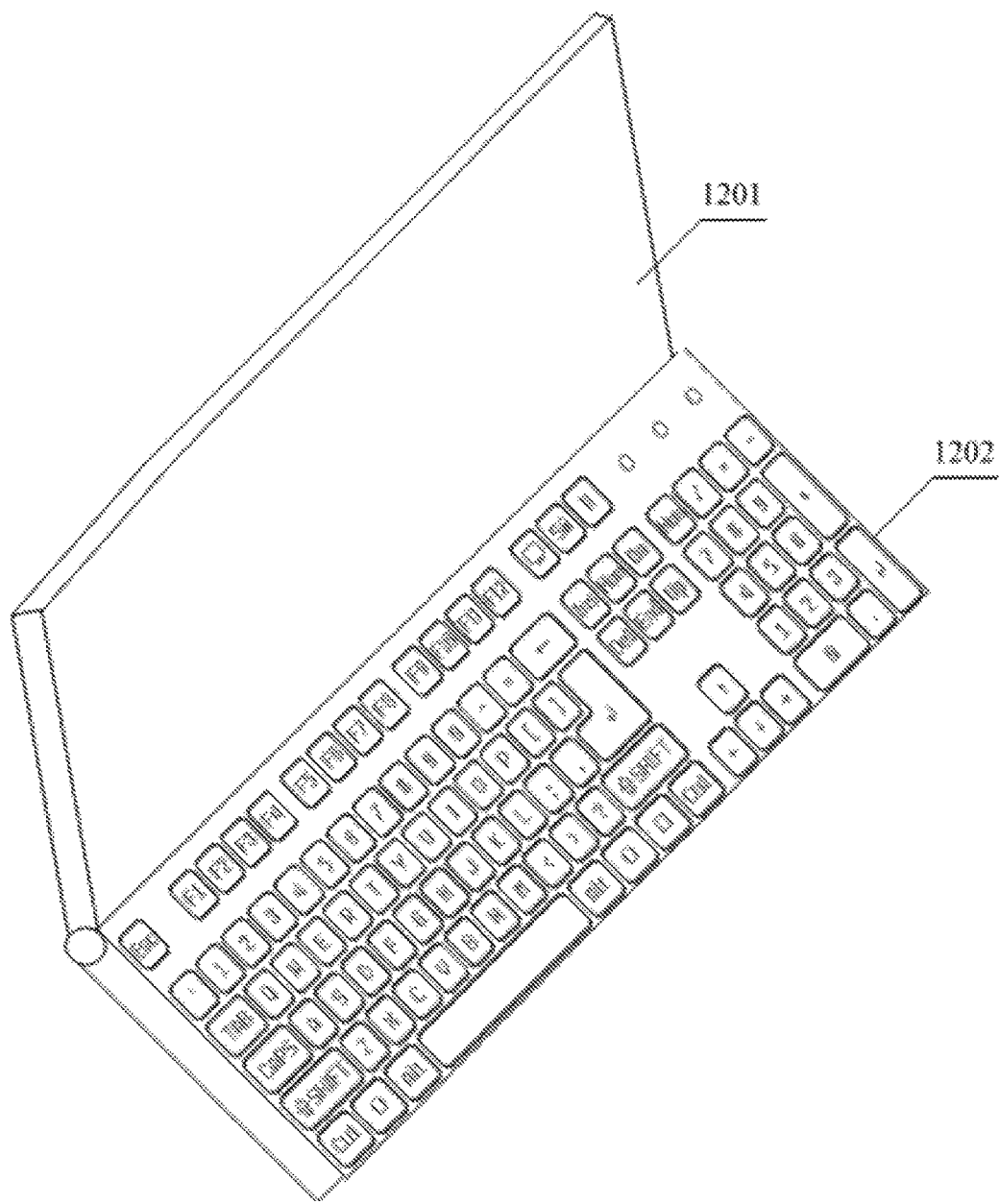
FIG. 12 is a perspective view illustrating one embodiment of an electronic device.

FIG. 12 depicts one embodiment of an electronic device. The electronic device may include a keyboard input interface in an input device 1202 of an electronic device 1201, wherein a qwerty-format keyboard is provided in the keyboard input interface.

Figure 13:
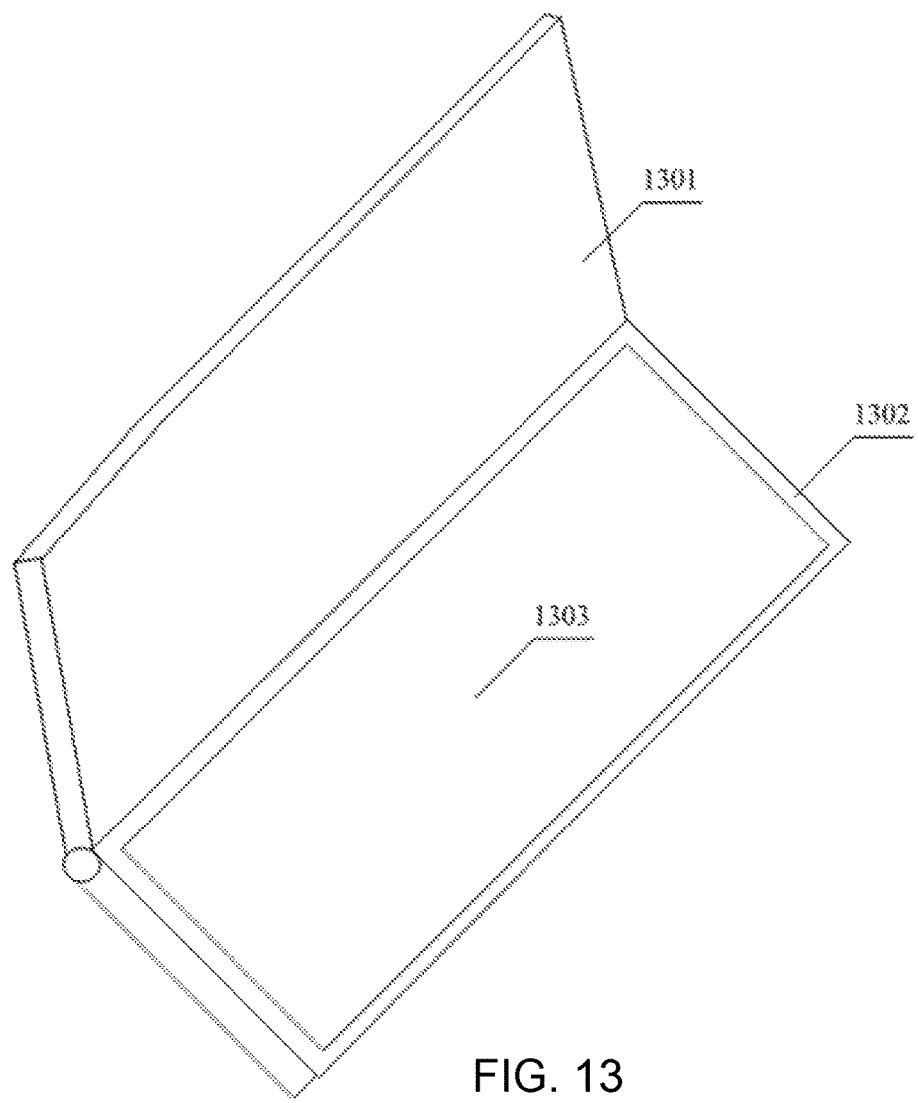
FIG. 13 is a perspective view illustrating one embodiment of an electronic device.

FIG. 13 is a schematic diagram illustrating one embodiment of another electronic device. The electronic device may include writing input interface of an input device 1302 of the electronic device 1301, and a prompt box 1303 for identifying an edge of a collection area of the input device 1302 is provided in the keyboard input interface. In one embodiment, the prompt box 1303 may be further configured to align carried paper.

In one embodiment, in the method as described above, controlling the working state corresponding to the input mode of the input device and the working mode of the input device 1302 in the operating state may include controlling a power supply method for the input device according to the first control instruction generated based on the input mode. The power supply method may include a power supply cut-off method, a first power supply method and a second power supply method. In one embodiment, when power is supplied to the input device in the first power supply method, the collection area of the input device may present a keyboard input interface that may include a keyboard format. In one embodiment, when power is supplied to the input device in the second power supply method, the collection area of the input device may present a writing input interface. By means of this method, the input interfaces of the input device can be switched by controlling the power supply methods of the input device.

The methods of the present disclosure may be implemented by means of apparatuses in multiple forms. Thus, the present disclosure also provides an electronic device adopting the methods, the electronic device being illustrated below in detail by means of provided specific embodiments.

Figure 14:
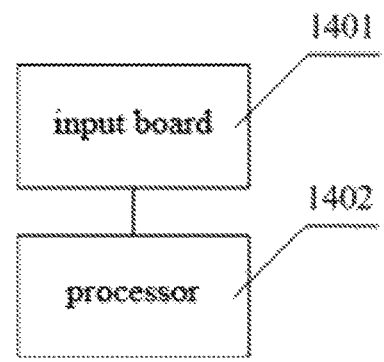
FIG. 14 is a schematic structural diagram of an embodiment of an electronic device.

FIG. 14 depicts a schematic structural diagram of one embodiment of an electronic device. The electronic device may include a laptop, a tablet personal computer, a mobile phone, a smart television, a smart watch, a wearable device, or the like.

The electronic device may include the following structures: an input device 1401 and a processor 1402. The input device 1401 may be configured to receive an input operation of an operator and generate corresponding input information.

The processor 1402 may be connected to the input device 1401 and may be configured to detect a relative arrangement of a display device of an electronic device and an input device of the electronic device, control the electronic device to operate either under a first input mode or a second input mode in accordance with the relative arrangement as detected, wherein the first input mode may provide user input via the display device whereas the second input mode may provides user input via the input device, and generate a first control instruction based on the input mode to control a working state corresponding to the input mode of the input device and a working mode of the input device in an operating state. The working state of the input device may include an operating state and an off state. The operating state may include at least two working modes.

If power is supplied to the input device by the processor in a first power supply method, a collection area of the input device may present a keyboard input interface that may include a keyboard format. If power is supplied to the input device by the processor in a second power supply method, the collection area of the input device may present a writing input interface. In some embodiments, the processor may be a central processing unit (CPU) of an electronic device.

In conclusion, the input mode of the electronic device provided in this embodiment may be determined based on the orientation information or relative arrangement of the electronic device. The working state of the input device of the electronic device and the working mode of the input device in the operating state are further controlled based on the determined input mode, thereby enabling a user to perform input by means of multiple working modes. The electronic device may include the advantages that an input form is added, the user can select a plurality of input methods corresponding to multiple working modes to perform input, thereby improving the user experience.

Figure 15:
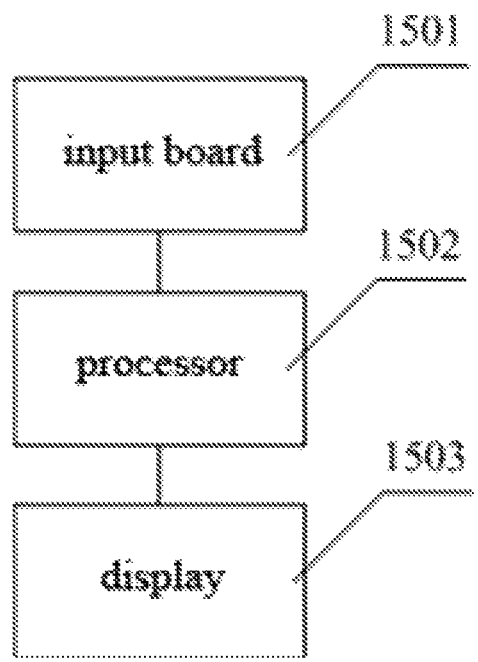
FIG. 15 is a schematic structural diagram of an embodiment of an electronic device.

FIG. 15 is a schematic structural diagram of one embodiment of an electronic device. The electronic device may include the following structures: an input device 1501, a processor 1502 and a display device 1503.

Structural functions of the input device 1501 may be consistent with those described above, therefore are not described in detail in this embodiment.

The display device 1503 is may be configured to display, under the control of the processor 1502, content to be displayed. The processor 1502 may be further configured to control a display method corresponding to an input mode of the display based on a first control instruction. When using the electronic device, a user may execute an input operation via an input device and check content output by the electronic device via the display device. Based on different orientations of the electronic device, it may be advantageous to adjust a working mode of the input device and the display method of the display device accordingly such that the input mode of the electronic device matches the display method, thus the user may have coordinated use experience.

In one embodiment, the display method of the display device of the electronic device is controlled accordingly according to the first control instruction generated based on the input mode, such that the display method of the display device may match the working state/working mode of the input device.

In conclusion, the electronic device provided in this embodiment may include the display device and the processor, the processing being configured to control the display method corresponding to the input mode of the display device based on the first control instruction. In the electronic device, in correspondence to the input mode, the display method of the display device may be adjusted accordingly, such that the input mode of the electronic device may match the display method, thereby improving the user experience.

Figure 16:
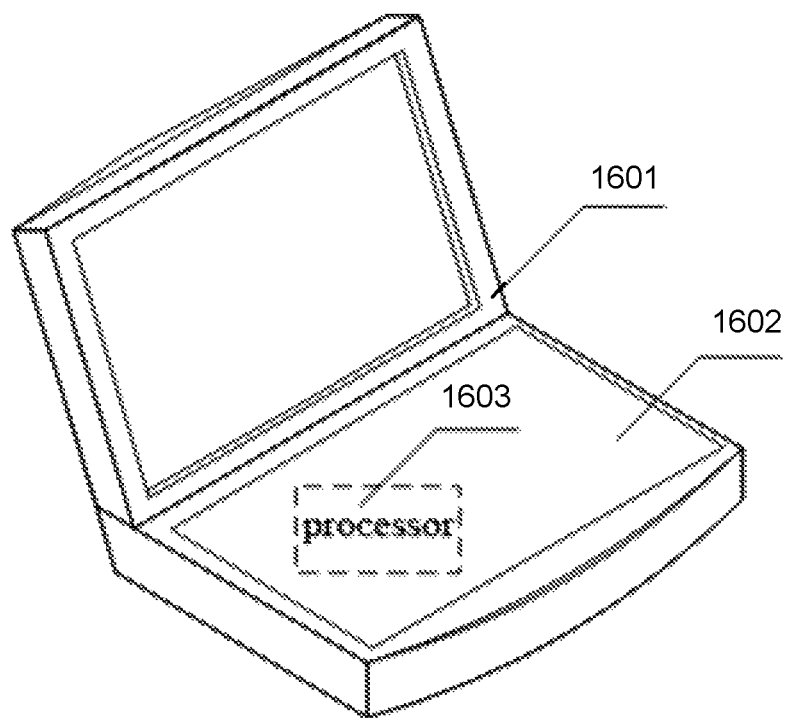
FIG. 16 is a perspective view illustrating an embodiment of an electronic device.

FIG. 16 depicts one embodiment of an electronic device. The electronic device may include an input device 1601, a processor 1602, and a main body 1603. Structural functions of the input device 1601 are consistent with those described above. The main body may include a first surface and a second surface. The second surface and the first surface may be disposed on different planes. A first angle value indicative of an included angle between the first surface and the second surface may include a relative arrangement or orientation information.

The processor 1601 may be configured to analyze the relative arrangement to obtain an included angle range within which the first angle value falls. The processor 1601 may perform analysis according to a preset correspondence between the included angle range and an input mode to determine the input mode corresponding to the relative arrangement.

A division angle range rule may be preset in the electronic device. For example, a preset angle range of 0°-360° may be divided into a plurality of intervals. The included angle range within which the first angle value falls may be obtained through analysis based on the preset angle range. The preset correspondence between the included angle range, between the first surface and the second surface, and the input mode may be preset in the electronic device. In one embodiment, the corresponding input mode may be determined based on the included angle range within which the first angle value falls.

In one embodiment, the input mode of the electronic device may be obtained through analysis based on the included angle value between the two surfaces of the electronic device, thereby controlling the working state of the input device, which may result in a small amount of data processing, and a simple process.

Figure 17:
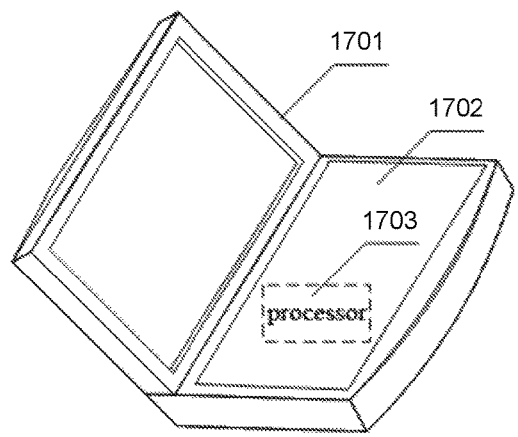
FIG. 17 is a perspective view illustrating an embodiment of an electronic device.

FIG. 17 depicts one embodiment of an electronic device. The electronic device may include an input device 1701, a processor 1702, and a main body 1703. Structural functions of the input device 1701 may be consistent with those described above and are not described in detail in this embodiment. As described above, a second surface and a first surface may located on different planes. In one embodiment, a relative arrangement of the electronic device may include a first angle value and a second angle value. The first angle value may include an included angle between the first surface and the second surface, and the second angle value may include an included angle between an intersecting axis of the first surface and the second surface and a horizontal plane.

The processor 1702 may be specifically configured to analyze the orientation information to obtain the first angle value in the orientation information, determine whether the first angle value falls within a first included angle range to obtain a first determined result. Based on the first determined result indicative of the first angle value not falling within the first included angle range, the electronic device may perform analysis according to a preset correspondence between the included angle range and an input mode to determine the input mode corresponding to the orientation information. Based on the first determined result indicative of the first angle value falling within the first included angle range, the electronic device may determine whether the second angle value is greater than a preset threshold to obtain a second determined result.

Based on the second determined result indicative of the second angle value being greater than the preset threshold, the electronic device may determine that the electronic device presents a first orientation and may perform analysis to obtain a first input mode corresponding to the first orientation presented by the electronic device. Based on the second determined result indicative of the second angle value being no greater than the preset threshold, the electronic device may determine that the electronic device presents a second orientation and perform analysis to obtain a second input mode corresponding to the second orientation presented by the electronic device.

Figure 18:
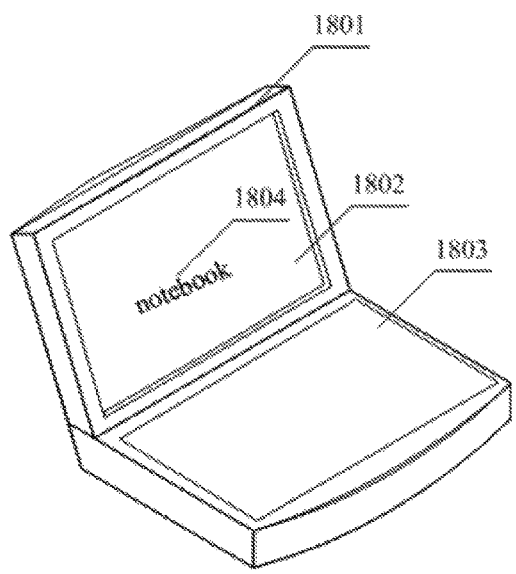
FIG. 18 is a perspective view illustrating one embodiment of an electronic device.

FIG. 18 shows a schematic diagram of one embodiment of an electronic device. The electronic device may include a first surface and a second surface. Illustrations are made in this embodiment by using a laptop as an example. The first surface may include a surface B 1802 of a laptop 1801, the second surface may include a surface C 1803 of the laptop, and an input device may be provided on the surface C. The electronic device may present a notebook orientation, and content 1804 may be displayed on the surface B. The displayed content refers to "notebook", and this word may be displayed by using an intersecting line between the surface B and the surface C as a bottom edge.

Figure 19:
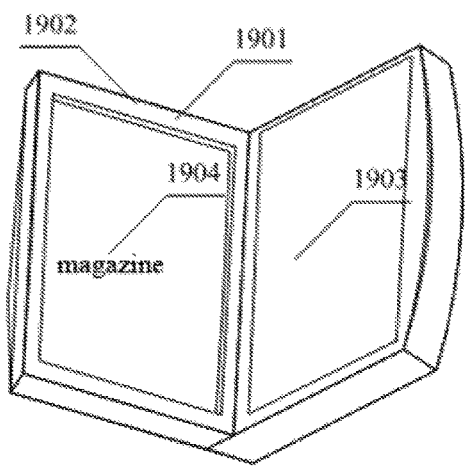
FIG. 19 is a perspective view illustrating one embodiment of an electronic device.

FIG. 19 shows another schematic diagram of one embodiment of an electronic device. The electronic device may include a first surface and a second surface. Illustrations are made in this embodiment by using a laptop as an example. The first surface may include a surface B 1902 of a laptop 1901, the second surface may include a surface C 1903 of the laptop, and an input device may be provided on the surface C. The electronic device may present a magazine orientation. Content 1904 may be displayed in the surface B. The displayed content may refer to "magazine" and this word may be displayed by using an intersecting line between the surface B and the surface C as a side edge.

In conclusion, in the electronic device provided in this embodiment, the orientation of the electronic device may be obtained by specific analysis based on an included angle value between two surfaces of the electronic device and an included angle between an intersecting axis of the two surfaces and a horizontal plane. Corresponding working states and working modes of an input device may be determined according to different orientations, thereby achieving detailed classification and guaranteeing the user experience.

The embodiments in this disclosure may be described in a progressive manner. Description of each of the embodiments may focus on differences from other embodiments, and reference may be made to each other for the same or similar parts among respective embodiments. For the device provided in the embodiment, the description may be brief as it corresponds to the method provided in the embodiments.

A person skilled in the art should be able to implement or use the present disclosure, after reviewing the description of the embodiments provided above. Various modifications of these embodiments are apparent to a person skilled in the art. The general principle defined herein can also be implemented in other embodiments without departing from the spirit or scope of the present disclosure. Accordingly, the present disclosure will not be limited to the embodiments demonstrated herein, but encompass the broadest scope consistent with the principle and novelty provided herein.

What is claimed is:

1. An electronic device, comprising:
   a display device;
   an input device that provides a plurality of input modes for user input, the input device being movably coupled to the display device; and
   a processor coupled to the display device and the input device, wherein the processor detects an operating mode of the electronic device and an input method and controls the input device to operate in an input mode based on both the operating mode and the input method, wherein the processor determines the input method based on a contact parameter, wherein in response to a user's finger, the input method is a keyboard input mode and in response to a pen, the input method is a writing input mode.

2. The electronic device of claim 1, wherein the processor further detects the operating mode of the electronic device based on a relative arrangement of the display device and the input device.

3. The electronic device of claim 2, wherein the processor further controls the input device to operate:
under the writing input mode in response to the display device being extended from the input device through an angle that exceeds a threshold angle; and
under the keyboard input mode in response to the display device being extended from the input device through an angle that does not exceed the threshold angle.

4. The electronic device of claim 3, wherein the threshold angle is 180 degrees.

5. The electronic device of claim 1, wherein the display device provides a further input mode for user input.

6. The electronic device of claim 1, wherein in response to the processor controlling the input device to operate under the keyboard input mode, the input device presents a keyboard input interface, and in response to the processor controlling the input device to operate under the writing input mode, the input device presents a writing input interface.

7. The electronic device of claim 6, wherein the keyboard input interface comprises a virtual keyboard displayed on the input device.

8. The electronic device of claim 1, wherein the operating mode is selected from the group consisting of:
an off mode, wherein at least one of the display device and the input device does not accept input;
a notebook mode, wherein at least one of the display device and the input device comprises a substantially horizontal orientation;
a magazine mode, wherein the at least one of the display device and the input device comprises a substantially vertical orientation;
a stand mode, wherein the relative arrangement of the display device and the input device comprises an angle between 180 and 360 degrees; and
a tablet mode, wherein the relative arrangement of the display device and the input device comprises an angle of 360 degrees.

9. A method, comprising:
detecting an operating mode of an electronic device comprising a display device and an input device that is movably coupled to the display device and an input method of the input device; and
controlling the input device of the electronic device to operate in an input mode based on both the operating mode and the input method, wherein the processor determines the input method based on a contact parameter, wherein in response to a user's finger, the input method is a keyboard input mode and in response to a pen, the input method is a writing input mode.

10. The method of claim 9, wherein the step of detecting the operating mode of the electronic device further comprises detecting a relative arrangement of the display device and the input device.

11. The method of claim 10, wherein:
detecting the relative arrangement of the display device and the input device comprises detecting an angle through which the display device extends from the input device;
in response to detecting that the angle exceeds a threshold angle, controlling the input device to operate under the writing input mode, and
in response to detecting that the angle does not exceed the threshold angle, controlling the input device to operate under the keyboard input mode.

12. The method of claim 11, wherein the threshold angle is 180 degrees.

13. The method of claim 9, wherein controlling the input device to operate under the keyboard input mode comprises presenting a keyboard input interface, and controlling the input device to operate under the writing input mode comprises presenting a writing input interface.

14. The method of claim 13, wherein the step of presenting the keyboard input interface comprising displaying a virtual keyboard on the input device.

15. The method of claim 9, wherein the operating mode of the electronic device is selected from the group consisting of:
an off mode, wherein at least one of the display device and the input device does not accept input;
a notebook mode, wherein at least one of the display device and the input device comprises a substantially horizontal orientation;
a magazine mode, wherein the at least one of the display device and the input device comprises a substantially vertical orientation;
a stand mode, wherein the relative arrangement of the display device and the input device comprises an angle between 180 and 360 degrees; and
a tablet mode, wherein the relative arrangement of the display device and the input device comprises an angle of 360 degrees.

16. A program product comprising a non-transitory computer readable storage medium that stores code executable by a processor, the executable code comprising code to perform:
detecting an operating mode of an electronic device comprising a display device and an input device that is movably coupled to the display device and an input method of the input device; and
controlling the electronic device to operate in an input mode based on both the operating mode and the input method, wherein the processor determines the input method based on a contact parameter, wherein in response to a user's finger, the input method is a keyboard input mode and in response to a pen, the input method is a writing input mode.

17. The program product of claim 16, wherein the code to perform detecting the operating mode of the electronic device comprises code to perform detecting a relative arrangement of the display device and the input device.

18. The programming product of claim 17, wherein the executable code comprises code to perform:
detecting the relative arrangement of the display device and the input device by detecting an angle through which the display device extends from the input device;
in response to detecting that the angle exceeds a threshold angle, controlling the input device to operate under the writing input mode, and in response to detecting that the angle does not exceed the threshold angle, controlling the input device to operate under the keyboard input mode.

19. The programming product of claim 18, wherein the threshold angle is 180 degrees.

20. The programming product of claim 16, wherein the executable code comprises code to perform, in response to controlling the input device to operate under the keyboard input mode, presenting a keyboard input interface, and in response to controlling the input device to operate under the writing input mode, presenting a writing input interface.

* * * * *